United States Patent [19]
Lacerte

[11] 3,843,202
[45] Oct. 22, 1974

[54] SOLID TIRE WHEEL
[76] Inventor: Maurice Lacerte, 1561 4th St. P.O. Box 114, Grand-Mere, Canada
[22] Filed: Nov. 29, 1972
[21] Appl. No.: 310,499

[52] U.S. Cl............ 301/63 PW, 152/380, 301/63 R
[51] Int. Cl................................................ B60b 5/00
[58] Field of Search........... 301/63 C, 63 R, 63 PW, 301/5 R; 152/374, 375, 378, 379, 380, 385, 386, 384; 295/7

[56] References Cited
UNITED STATES PATENTS

| | | | |
|---|---|---|---|
| 595,333 | 12/1897 | Osborn | 152/380 |
| 614,055 | 11/1898 | Kendall | 152/380 |
| 1,371,551 | 3/1921 | Elten | 152/379 |
| 3,387,894 | 6/1968 | Louik | 301/63 PW |
| 3,666,322 | 5/1972 | Pickron | 301/63 PW |

FOREIGN PATENTS OR APPLICATIONS

| | | | |
|---|---|---|---|
| 1,275,899 | 3/1962 | Germany | 301/63 PW |
| 647,141 | 12/1950 | Great Britain | 152/379 |

Primary Examiner—Robert S. Ward, Jr.
Assistant Examiner—Reinhard J. Eisenzopf
Attorney, Agent, or Firm—Bacon & Thomas

[57] ABSTRACT

A wheel structure is disclosed suitable for material handling equipment. The wheel has a metal rim with a solid tire of plastic material molded thereon. Dislodgement of the tire from the rim is positively prevented by penetration of the tire material into one or more circumferential grooves in the rim and into lateral holes in the rim which communicate with such groove or grooves to provide an interlock between the tire and the rim.

8 Claims, 11 Drawing Figures

PATENTED OCT 22 1974 3,843,202
SHEET 1 OF 2
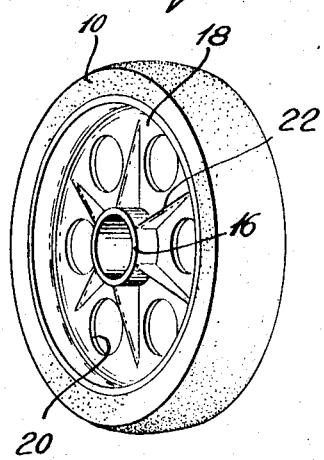
Fig. 1
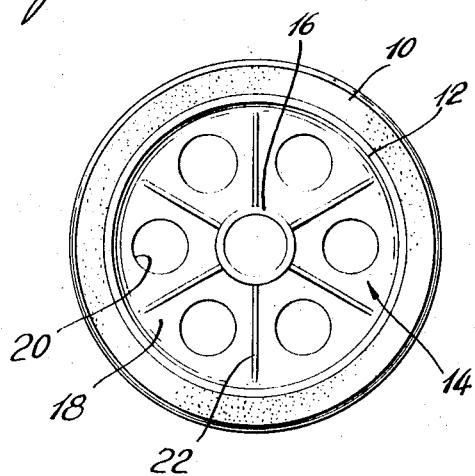
Fig. 2
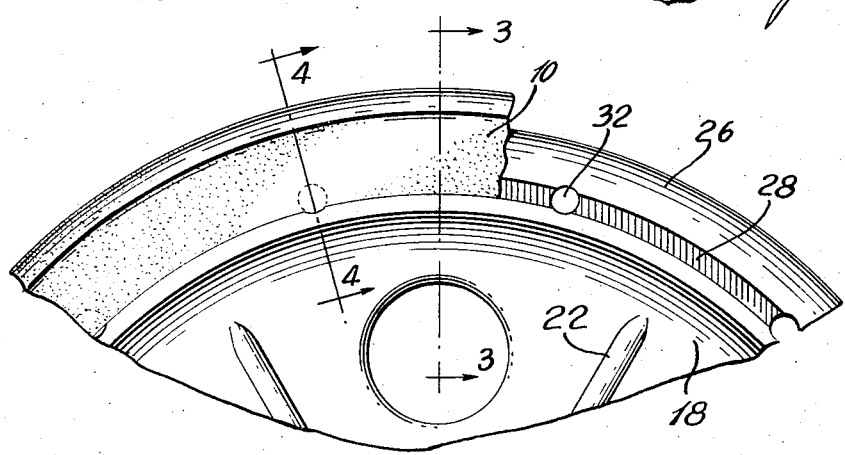
Fig. 3
Fig. 4
Fig. 5

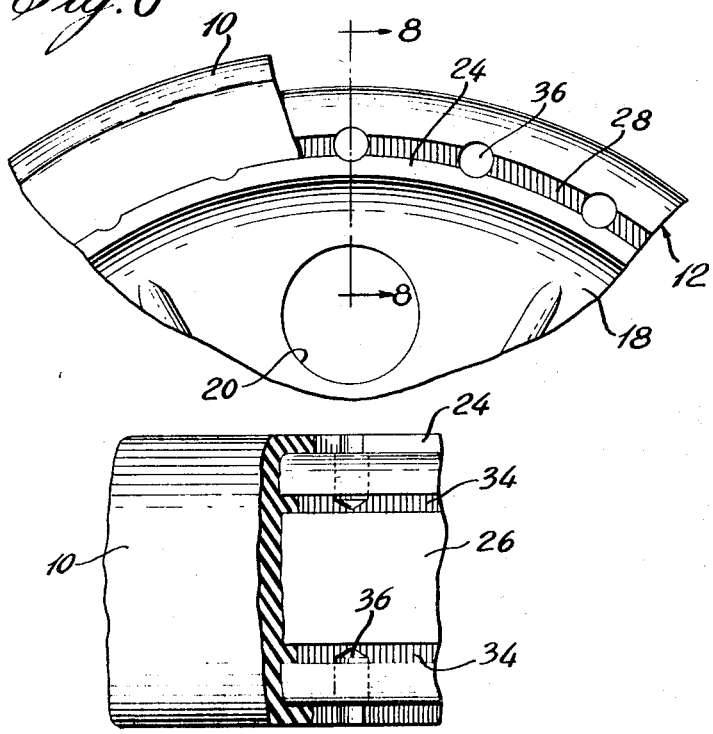
Fig. 6
Fig. 7
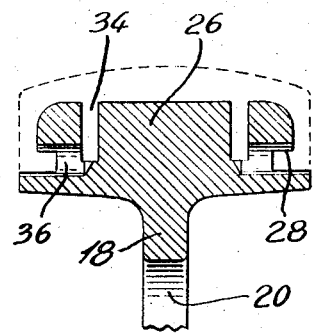
Fig. 8
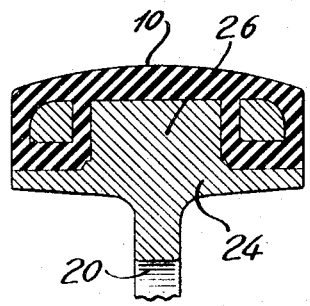
Fig. 9
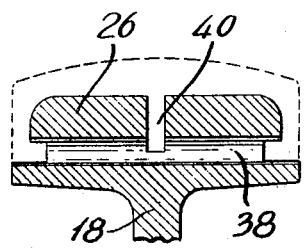
Fig. 10
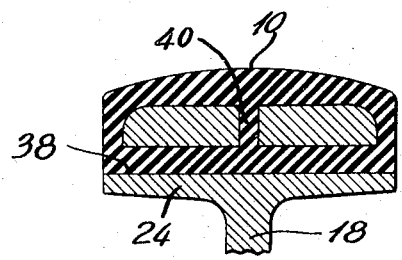
Fig. 11

SOLID TIRE WHEEL

The present invention relates to a solid tire wheel. Wheels of this type are known, and are primarily designed for use on material handling equipment such as trucks, barrows or carts employed over short distances on smooth surfaces for example to transport material or work pieces within a factory or to take items to and from a loading dock in a warehouse.

Material handling vehicles of this type are frequently towed by a tractor and the weight to which they are subjected may range into the thousands of pounds. Therefore in spite of the low speeds involved and the relative smoothness of the surfaces on which they are operated it is necessary to ensure that the tires are not knocked off the rim by incidental obstacles or by the additional lateral stress imposed on them when negotiating tight curves.

Bonding of the tire to the rim and the provision of rim flanges have been found inadequate to this end. The bonding soon wears off through use while the tire still has much useful life left to it. The rim flanges must be kept low to avoid contact with the floor and they are therefore insufficient to resist the lateral stresses imposed on the tire.

Also known are interlocking system in which projecting portions integral with the rim are embedded in the tire, which in these cases is molded directly onto the rim instead of being shaped separately and then mounted on the rim. The known interlocking systems, however, are conducive to excessive wastful use of tire material and under extreme stress conditions the tire is liable to tear or the rim projections to being sheared off.

The present invention constitutes an improvement over known interlocking systems which results in more economical use of tire material and better resistance to breakage.

The invention accordingly proposes a wheel comprising a rim, at least one circumferential groove on the outer face of the rim, a plurality of spaced lateral holes in the rim communicating with the groove and a solid tire on the rim extending continuously into the groove and into the holes. As a result positive interlocking between the rim and the tire is achieved without weakening the rim structure. In addition the groove effectively holds the central portion of the tire tread onto the rim, thus enabling the tire to be substantially thinner.

According to a further feature of the invention the rim has a radially outwardly projecting portion and the holes are in the sides of the projecting portion and the tire covers the outer face and the side face of the projecting portion. This arrangement provides for solid backing of the tire against both radial and axial stress.

Further according to the invention the main portion of the rim excluding the projecting portion is a relatively thin cylinder, whose margins extend beyond the sides of the projecting portion and the sides of the tire are flush with the edges of the cylinder constituting the rim. As a result the tire is fully supported and protected and lightness is achieved without sacrificing stength.

Preferred embodiments of the invention are illustrated by way of example in the accompanying drawings, in which:

FIG. 1 is a perspective view of a wheel according to the invention;

FIG. 2 is a side elevation of the same.

FIG. 3 is a fragmentary cross-section of the wheel according to a first embodiement, taken along line 3—3 of FIG. 5;

FIG. 4 is a fragmentary cross-section of the same wheel taken along line 4—4 of FIG. 5;

FIG. 5 is a fragmentary side elevation of the wheel shown in FIGS. 3 and 4, with the tire partly cut away;

FIG. 6 is a fragmentary side elevation of the wheel according to a second embodiment of the invention, with the tire partly cut away;

FIG. 7 is a fragmentary end view of the wheel shown in FIG. 6;

FIG. 8 is a fragmentary cross-section of the rim of the whell shown in FIGS. 6 and 7, taken along line 8—8 of FIG. 6;

FIG. 9 is a fragmentary cross-section corresponding to FIG. 8, but with the tire in place;

FIG. 10 is a fragmentary cross-section of the rim of a wheel according to a third embodiment of the invention;

FIG. 11 is a fragmentary cross-section corresponding to FIG. 10, but with the tire in place.

Refering to FIGS. 1 and 2 the invention in all three embodiments comprises a tire 10, a rim 12, a spoke section 14 and a hub 16. The spoke section consist of a plate 18 with lightening holes 20 and reinforcing ribs 22 between the holes.

Rim 12, spoke section 14 and hub 16 are integrally cast of metal, preferably an aluminum alloy to reduce weight.

The tire 10 is directly molded onto the rim 12 and consists of wear resistant resilient material, preferably polyurethane.

Again in each of the three embodiments the rim 12 comprises a base portion 24 consisting of a relatively thin cylinder and a projecting portion 26 extending radially outwardly centrally of base 24. The margins of cylinder 24 extend beyond the sides of projecting portion 26. The projecting portion 26 is essentially rectangular in cross-section with its outer corners rounded and has at the base of each side thereof a groove 28.

The tire 10 extends over the outer face and the side faces of projecting portion 26 and into the grooves 28. The sides of the tire are flush with the edges of cylinder 24.

In the embodiment of FIGS. 3 to 5 the projecting portion 26 is provided with a pair of spaced circumferential grooves 30 at the outer face thereof and with spaced lateral holes 32 opening from the side grooves 28 and passing clear through the projecting portion 26. Grooves 30 and holes 32 are filled with tire material during the molding operation. The grooves 30 are of sufficient depth to intersect the holes 32 so that tire material is continuous through the holes and the grooves and forms a positive interlock between the tire and the rim.

In the second embodiment shown in FIGS. 6 to 9 there are circumferential grooves 34 similar to grooves 30 of the first embodiment, but the holes 36 only reach from each side as far as the adjacent groove 34 and do not pass through the rim.

In the third embodiment illustrated in FIGS. 10 and 11 the lateral holes 38 again pass through the rim projection 26 but only one circumferential groove 40 is provided.

It will be seen that in each case a positive interlock is provided between the tire and the rim. The three embodiments are alternative constructions to suit particular circumstances. Thus the second embodiment will be employed where it is feared that through holes may unduly weaken the rim where extremely high radial stress is expected. On the other hand the third embodiment may be adopted where it is expected that axial stress will be more of a problem.

The embodiments of the invention in which an exclusive property or privilege is claimed are defined as follows:

1. A wheel comprising
a rim having an outer face and side faces,
at least one circumferential groove on the outer face of said rim,
a plurality of spaced lateral holes in said rim communicating with said groove,
and a solid tire on said rim having one portion extending into and filling said groove and said holes and having a second portion extending from said holes to the outer face of said rim and covering said side faces of said rim, the solid tire and said two portions being integral.

2. A wheel according to claim 1, wherein said rim has a radially outwardly projecting portion and said holes are in the sides of said projecting portion and said tire covers the outer face and the side faces of said projecting portion.

3. A wheel according to claim 2, wherein said projecting portion has lateral grooves at the base of the sides thereof and said holes open into said lateral grooves.

4. A wheel according to claim 3, wherein the main portion of said rim excluding said projecting portion is a relatively thin cylinder having edges which extend beyond the sides of said projecting portion.

5. A wheel according to claim 4, wherein the sides of said tire are flush with the edges of said cylinder constituting the rim.

6. A wheel according to claim 2, wherein said rim has two circumferential grooves and said holes extend through the rim.

7. A wheel according to claim 2, wherein said rim has two circumferential grooves and said holes extend from each side of said rim up to the adjacent groove.

8. A wheel according to claim 2, wherein said rim has one circumferential groove and said holes extend through said rim.

* * * * *